United States Patent [19]
Bohoroquez et al.

[11] 3,767,313
[45] Oct. 23, 1973

[54] POSITIVE FEED DRILL

[75] Inventors: Luis A. Bohoroquez, Inglewood;
Pierre G. Vindez, Redondo Beach,
both of Calif.

[73] Assignee: Zephyr Manufacturing Co., Inc.,
Inglewood, Calif.

[22] Filed: Oct. 20, 1971

[21] Appl. No.: 190,763

[52] U.S. Cl................ 408/14, 408/57, 408/132, 408/137
[51] Int. Cl........................ B23b 45/04, B23b 47/22
[58] Field of Search ............... 408/15, 14, 12, 126, 408/241 S, 10, 8, 137, 129, 124; 90/11 E

[56] References Cited
UNITED STATES PATENTS

3,487,729  1/1970  Juhasz et al. .................... 408/14
3,526,158  9/1970  Adams et al. .................... 408/129 X
1,929,585  10/1933  Henry ............................ 408/241 S

*Primary Examiner*—Gil Weidenfeld
*Attorney*—Whann & McManigal

[57] ABSTRACT

A portable positive feed drilling device in which the drill spindle is automatically advanced and retracted, having a work surface sensing mechanism which cooperates with an adjustable spindle stop carried by the spindle for precisely arresting the forward travel of the spindle at a predetermined point relative to the surface of the work. After the spindle advance is stopped, the spindle feed and driving mechanism allow the spindle to dwell for a few turns and then automatically retract. A rapid spindle advance system is provided for rapidly advancing the spindle into proximity with the work prior to the start of a drilling operation.

15 Claims, 11 Drawing Figures

PATENTED OCT 23 1973 3,767,313

LUIS A. BOHORQUEZ
PIERRE G. VINDEZ
INVENTOR.
WHANN & McMANIGAL
Attorneys for Applicants
BY

POSITIVE FEED DRILL

BACKGROUND OF THE INVENTION

1. Field of the invention.

This invention relates generally to positive feed drills and more particularly to portable, pneumatically operated positive feed drills of the type for automatically controlling the depth of hole which is to be drilled.

2. Description of the prior art.

A very useful prior art positive feed drilling device of the type having means for automatically controlling the advance of the drill spindle is a device described in U.S. Pat. No. 3,487,729 entitled "Positive Depth Control Drill" invented by Juhasz, Bohorquez and Vindez, the last two named inventors being the inventors of the present invention. The device disclosed in the previously identified patent consists of a portable powered drill adapted to be mounted on a jig or fixture which is clamped to the work, and comprises means for advancing and retracting the drill spindle, means for arresting forward movement of the spindle at a fixed point relative to the drill housing, and an auxiliary motor for rapid advancement of the drill spindle.

The device described herein has several advantages over the device described in the previously identified patent. One of these is that, since the forward movement of the spindle is arrested at a point relative to the surface of the work to be drilled rather than at a point relative to the drill housing, as is the case in the prior art device, significantly greater accuracy of depth of drill can be achieved. For example, even where the work exhibits an irregular surface precluding accurate positioning of the drilling jig and the drill housing relative to the surface of the work, precise depth of drill relative to the surface is possible with the device of the invention as described herein. Similarly instances where the work tends to deflect or deform during drilling, since the depth of drill is controlled relative to the surface of the work rather than relative to the housing of the drill the depth of the drilled hole may be precisely controlled.

Accordingly, an important object of the present invention is to provide a positive depth control drilling device having means for sensing the surface of the work which is being drilled, and means cooperating therewith for precisely limiting the advance of the drill spindle at a predetermined point relative to the surface of the workpiece at the location to be drilled.

In order to facilitate tool setup and to preclude operating delays, the previously identified device was provided with means for rapidly advancing the drill spindle relative to the work. This was accomplished by use of a reversible motor which allowed the spindle to be driven oppositely to its normal direction of rotation while the spindle feed gear was held against rotation. In operating the fast advance feature, the operator was required to manipulate a pressure valve, simultaneously operate a switch to reverse the motor, attempt to visually gauge advance of the spindle, and at the proper time release the valve to stop the advance of the spindle and then again reverse the motor for normal operation. In practice the operator frequently misjudged the advance of the spindle and failed to stop the motor in time, thereby causing damage to the work and to the tool. We have provided in the device of the invention a novel spindle advance mechanism which has several advantages over the arrangement in the prior art device. The spindle advance mechanism of the invention is efficient, simple to operate and cannot damage the work.

Another advantage of the invention over the drilling device described in Patent No. 3,487,729 relates to the safety means provided for stopping the tool in the event of malfunction of the automatic spindle retraction mechanism. In the prior art device if the means for retracting the drill spindle failed to operate, the spindle would continue to rotate until a shear pin provided on the driving motor failed. Since the shear pin was required to withstand significant torque loading in order to allow normal drilling operations to be accomplished, it would fail in case of malfunction only after the drill components were exposed to stress levels which could severely damage the tool and make its operation unsafe. In the positive drill of the invention described herein, we provide a novel safety clutch mechanism which decouples the spindle feed gear from its driving means in the event of malfunction of the automatic spindle retraction mechanism.

SUMMARY OF THE INVENTION

It is an object of the invention to provide a positive control drill in which the depth of the drill hole as measured from the surface of the work can be precisely controlled without using elaborate drilling jigs and fixtures and without the necessity for precise setup of the jigs and fixtures relative to the work.

It is a further object of the present invention to provide a means for fast advance of the drill spindle which may be conveniently operated by the user and which will automatically stop the advance of the spindle when the drill engages the work without damaging either the tool or the work.

It is still a further object of the present invention to provide a safety means in operative association with the drill spindle to prevent damage to the device in instances where the automatic spindle retraction means fails to operate.

It is another object of the invention to provide a tool as described in the previous paragraphs in which a mechanical linkage is provided in cooperative association with the drill spindle feed member to positively and reliably operate control means for controlling the drill spindle feed member to allow retraction of the drill spindle when the desired depth of drill is achieved.

It is still another object of the invention to provide a tool of the class described in which a simple and highly reliable surface sensing mechanism is provided for cooperation with an adjustable stop with the drill spindle to limit the advance of the drill spindle at a predetermined point relative to the surface of the work.

The foregoing and other objects of the invention are realized by a positive depth control drill having a rotatable spindle, driving means for advancing and retracting the spindle relative to a workpiece, sensing means for sensing the location of the surface of the workpiece, and means cooperatively associated with the driving means and the sensing means for automatically and precisely limiting the advance of the spindle at a predetermined point relative to the surface of the work.

DESCRIPTION OF THE PREFERRED EMBODIMENT

Figures 1, 3, 4, 8:
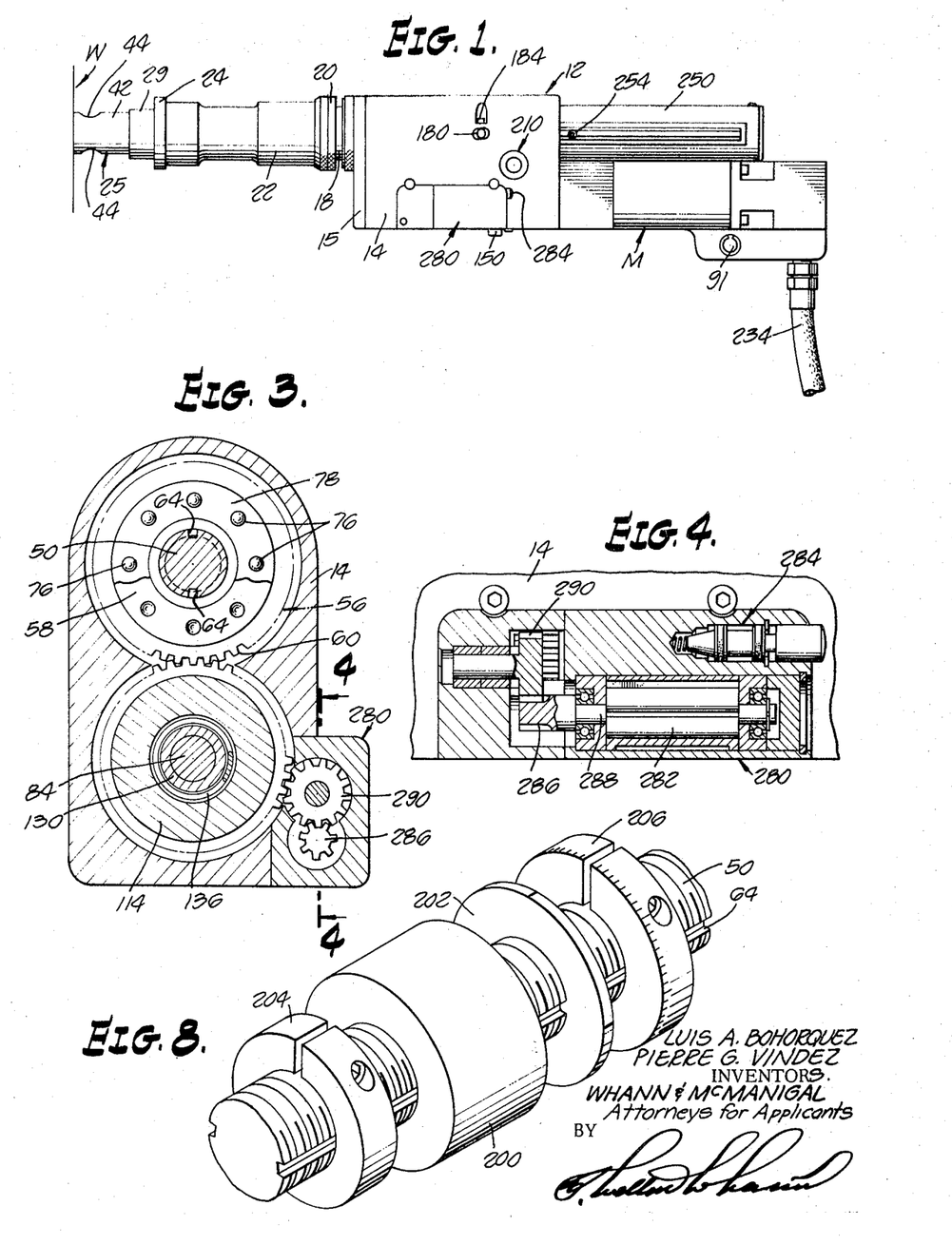
FIG. 1 is a side elevational view illustrating a drill embodying a form of the invention.
FIG. 3 is a cross-sectional view on line 3—3 of FIG. 2A illustrating the safety clutch feature of the invention.
FIG. 4 is a longitudinal section view taken along line 4—4 of FIG. 3 illustrating the construction of the rapid spindle advance mechanism of the invention.
FIG. 8 is a fragmentary perspective view illustrating the arrangement of the adjustable spindle stop assembly.
Figure 2A:
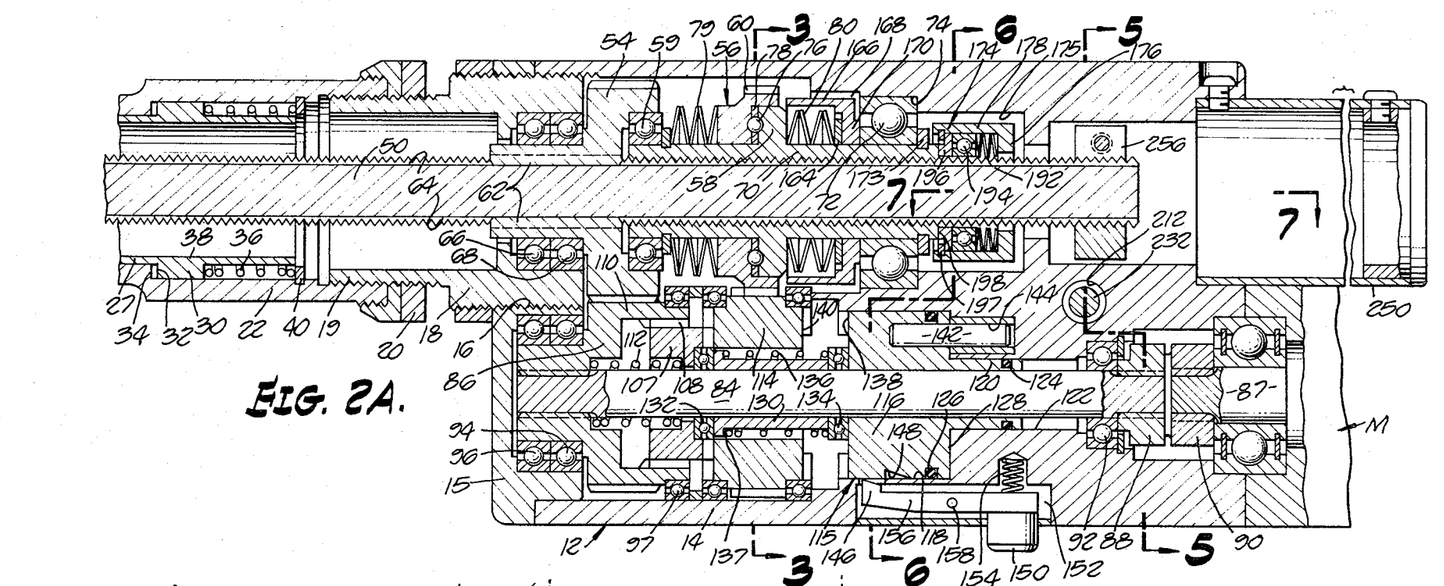
FIG. 2 is a fragmentary longitudinal section view of the apparatus with FIG. 2A illustrating the spindle driving mechanisms and FIG. 2B illustrating the surface sensing means provided at the forward end of the device.
Figure 2B:
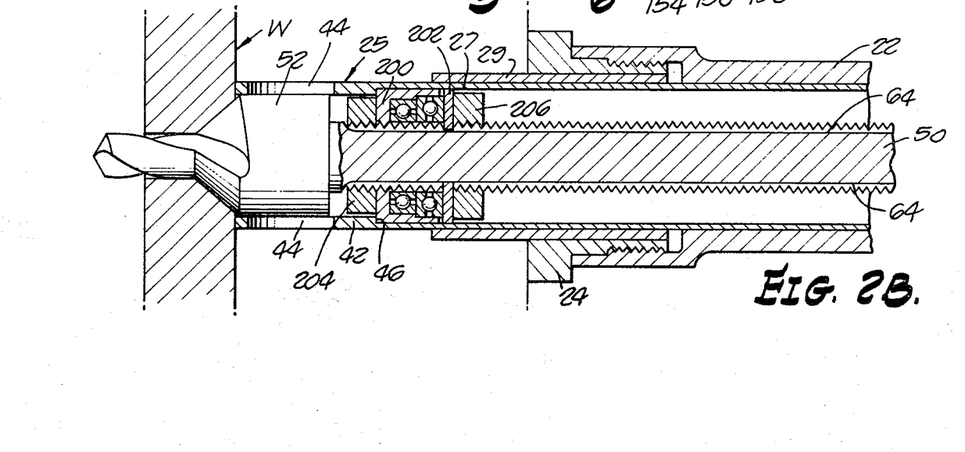

Referring to FIGS. 1, 2A and 2B of the drawings, the positive drill of the invention is shown positioned in working engagement with a workpiece W. The invention is particularly suitable for drilling and countersinking where the depth of the hole, as measured from the surface of the work, must be accurately controlled automatically.

Referring particularly now to FIGS. 2A and 2B, the preferred embodiment of the invention can be seen to include a housing 12 comprised of a housing body or main housing member 14 and a front plate 15. The latter may be held in place by screws (not shown) or other means. The plate has an internally threaded hole 16 to receive an adapter 18 which has a radially reduced externally threaded forward section 19 upon which a micrometer sleeve 20 is mounted. The sleeve receives a generally cylindrically-shaped barrel 22 by means of which the drill is secured to a drill bushing 24 which in turn may be mated with a holding fixture (not shown) or other means for holding the drill adjacent the work.

At the forward or left end of the tool as viewed in FIGS. 2A and 2B, we provide means, generally designated by the numeral 25, for sensing the surface of the work immediately adjacent the area to be drilled. Sensing means 25 is an important feature of the invention and, as will be described in the paragraphs which follow, cooperates with the drill spindle driving means to automatically control the depth of drill relative to the work surface to accuracies heretofore not possible with drills of this type.

Sensing means 25 is shown as comprising an elongated generally cylindrically-shaped sensing sleeve 27 mounted for telescopic movement axially within barrel 22 and a sleeve 29 carried by bushing 24. Near the rearward extremity of sleeve 27, as seen in FIG. 2A, there is formed an enlarged diameter section 30 having a forward shoulder 32 adapted to engage a shoulder 34 formed internally of barrel 22. Means for urging sleeve 27 forwardly relative to barrel 22 is provided in the form of a spring 36 which is seated at its forward extremity against a rear shoulder 38 of section 30 and at its rearward extremity against a locating ring 40 carried internally of barrel 22.

Referring to FIG. 2B, near the forward end of sensing sleeve 27 is a section 42 of reduced internal diameter having a plurality of openings 44 for the passage of chips. An internal shoulder 46 formed at the rearward extremity of section 42 serves as a sensing sleeve stop for limiting advance of the drill spindle in a manner which will presently be described.

An externally threaded spindle 50 extends through the housing and is shown provided with a demountable work engaging tool in the form of a countersink drill 52 in its forward end. Driving means for advancing and retracting the spindle relative to the workpiece comprises the spindle driving mechanism described in the paragraphs which follow.

Referring to FIG. 2A, the spindle is supported for rotation and for axial movement in a drive gear 54 and a feed gear 56, the latter comprising an internally threaded hub portion or feed member 58 which threadably receives the spindle so that it acts as a nut, and a feed member driving means in the form of a cooperating toothed gear portion 60. A splined connection is provided between the drive gear and the spindle, the drive gear having a pair of internal splines 62 which are received in grooves in the spindle. The drive gear is supported in the adapter 18 by bearings 66 and 68. The spindle feed member 58 has a forward portion partially received in the drive gear and supported by a bearing 59, and a long rearwardly extending portion 70 which is journaled in a bearing 72 in a counterbore 74 in the housing body. A safety clutch or decoupling means is provided between member 58 and feed member driving means 60, shown here in the form of a plurality of ball bearings 76 carried in a ring 78. As seen in FIG. 3, member 58 and driving means 60 are provided with a plurality of cavities arranged to receive balls 76 so that rotational movement of gear 60 will be transmitted to feed member 58 when the parts are in the position shown in FIG. 2A with spring 79 urging the parts into mating engagement. If member 58 is moved axially rearwardly against the urging of spring 80 in a manner soon to be discussed, driving means 60 will be allowed to rotate independently of feed member 58.

Drive gear 54 is driven by a first motor, designated M, which may be one which operates on compressed air (or other gas) by means of a drive shaft 84 and a drive pinion 86 which is drivably coupled thereto and meshes with the drive gear. The shaft is connected to the motor shaft 87 by tangs 88 and 90 provided on the motor and drive shafts respectively. A torque sensing device 91 is provided which will shut off the motor when an excessive overload that could damage the tool occurs.

Drive shaft 84 is rotatably supported at its rearward end in bearing 92 and at its forward end by drive pinion 86 which is in turn rotatably supported by bearings 94 and 96 carried by front plate 15. It is to be noted that the bearing arrangement 94, 96 and 97 protects drive shaft 84 from axial bending loads due to resistance to rotation of the pinion gears when the tool is under heavy load. With the construction illustrated, the spindle is rotated at all times when the motor is running. On the other hand, the spindle feed member of the feed gear is driven to advance the spindle and stopped to retract it.

A coupling element 107 is axially slidable on shaft 84 and is driven by spline 108 formed internally of a skirt portion 110 of drive pinion 86. A compression coil spring 112 between coupling member 107 and drive pinion 86 yieldably holds the former in driving engagement with a feed pinion 114. Thus, with the parts in the position of FIG. 2A and the motor operating, both the spindle and feed gear rotate; but, by reason of a desired difference in gear ratio of the drive and feed gears with respect to the drive shaft, the spindle advances.

For the purpose of disengaging the coupling member 107 from feed pinion 114, we provide a brake 115 having an enlarged cylindrical forward section 116 which operates as a piston in bore 118 and a reduced section 120 which is received in a smaller bore 122. Seal rings 124 and 126 are provided, as shown. Fluid (preferably a gas such as air) under pressure admitted into space 128 behind the brake moves it and a coupling actuator member 130 which is mounted for axial movement on shaft 84 to the left (FIG. 2A) or forwardly, disengaging coupling member 107 from feed pinion 114. Front and rear thrust bearings 132 and 134 are provided on either side of coupling actuator member 130 and a compression spring 136 is located between rear bearing 134 and a shoulder 137 on actuator member 130 for urging against forward movement of brake 115. When fluid pressures exerted against brake 115 are sufficient to overcome the resistance of springs 136 and 112, the brake will move forwardly to engage feed pinion 114 to stop its rotation, the forward edge 138 of the brake and the rear edge 140 of the pinion having mating toothed faces for the purpose. Guide pins 142 in the brake are received in bores 144 in the housing to prevent rotation of the brake.

A latch means is provided for preventing the brake from returning due to the urging of spring 136 and for holding it in a position such that it is disengaged from feed pinion 114 and such that the coupling 107 is also disengaged from the feed pinion, leaving the feed gear "freewheeling". The latch means includes a latch element 146 for engaging in a notch 148 of the periphery of the brake, a button 150 in a bore 152 in the housing fitted with a compression spring 154, and a lever 156 connecting the button with latch element 146. The lever is pivotally connected to a pivot pin 158 on which it pivots in bore 152.

It is a particular feature of the invention that we provide means for precisely limiting the advance of the spindle so that it will stop at a predetermined point relative to the surface of the work, dwell for a few turns, and then retract. This is accomplished in general by the cooperative interaction among the means for advancing and retracting the spindle, a spindle stop means on the spindle, as best seen in FIG. 2B, and a sensing sleeve stop shown in the form of internal shoulder 46 of surface sensing sleeve 27. Describing this feature more in detail and again referring to FIG. 2A, feed gear member 58 is mounted for limited axial movement, but normally is held in its forward position by compression spring or springs 80 (preferably Belleville springs) which bear against a preloading spacer 164 carried by a feed member driving gear stop member 166 mounted in a feed member 58 in the housing. Stop member 166 has a head portion 170 which seats against bearing 72 which is carried by housing 14 and which is axially located relative to member 58 by means of a locking ring 173.

Figure 6:
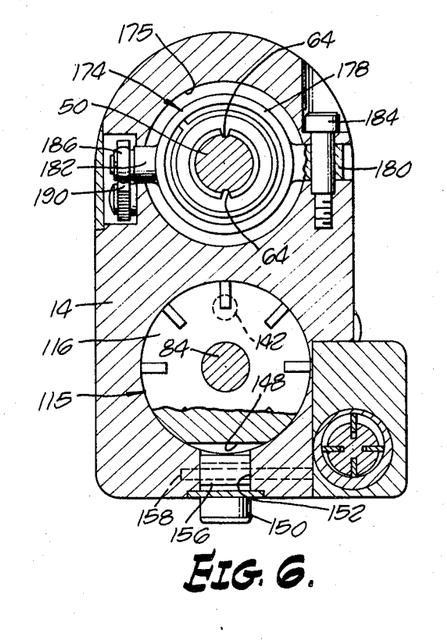
FIG. 6 is a cross-sectional view on line 6—6 of FIG. 2A showing the construction of a portion of the spindle retraction mechanism.
Figure 7:
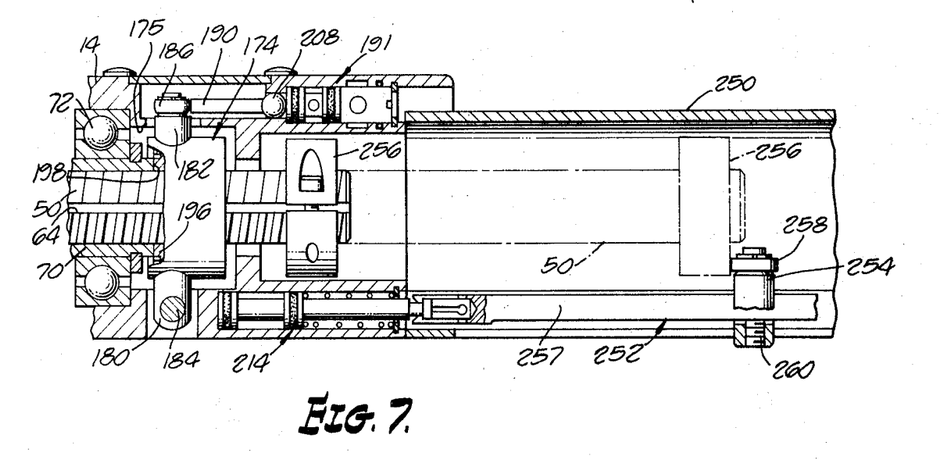
FIG. 7 is a view taken along line 7—7 of FIG. 2A further illustrating a portion of the spindle retraction mechanism and also showing the construction of the spindle stroke limiting apparatus of the invention.

Associated with the feed gear member 58 is a mechanical linkage for actuating a valve means for causing the rapid retraction of the spindle when its advance has been stopped by the stop means. This linkage, as can best be seen by referring to FIG. 2A, FIG. 6, and FIG. 7, comprises an actuating member 174 mounted coaxially with the spindle in a bore 175 in housing 14. Actuating member 174 has a head portion 176, a skirt 178, and two diametrically opposed, radially protruding arms 180 and 182. A pivot pin 184 is threadably connected to housing 14, protrudes through arm 180, and serves as a pivot arm for limited pivotal movement of actuating member 174. On arm 182 we provide a roller 186 which, upon pivotal movement of member 174, moves a lever arm 190 pivotally carried by housing 14, which in turn operates the valve means 191 (FIG. 7) for causing retraction of the spindle. Carried within skirt portion 178 of the actuating member is a spring 192 (FIG. 2A) adapted to urge a thrust bearing 194 against an adjusting spacer 196 which is axially located within skirt portion 178 by a locating ring 197. As can be seen in FIG. 2A, actuating member 174 is positioned within bore 175 so that spacer 196, due to the urging of spring 192, is normally in engagement with the rear face of feed gear hub 58.

Turning to FIG. 2B and FIG. 8, the spindle stop means can be seen to comprise a generally cylindrically-shaped spindle stop and guide first member 200 and a second member in the form of locating ring 202, which is keyed to slide axially of the spindle in spindle grooves 64. Forward and rear locking nuts 204 and 206 respectively (shown as split nuts with cross screws to lock them) comprise means for adjustably locating member 200 and ring 202 axially on the spindle. This micrometer adjustment controls the distance which the drill bit will advance beyond the forward face of the sensing sleeve, which in turn controls the depth of the drilled hole which is to be made. Since the sensing sleeve is free to telescope within barrel 22 against the urging of spring 36, it will automatically position the sensing sleeve stop means relative to the surface of the work in an area immediately adjacent the drilling location. The diameter of stop member 200 is such that it will freely move longitudinally within sensing sleeve 27 rearwardly of shoulder 46, but will engage shoulder 46 so as to limit forward movement of the spindle at a point which is always a fixed distance from the true surface of the work to be drilled.

In operation of the tool, as spindle 50 is moved forwardly by feed gear 56, a point will be reached where the spindle stop member will engage shoulder 46, stopping further advance of the spindle. Since the spindle will continue to rotate under the influence of the drive gear, the feed gear will necessarily move backward on the spindle and force actuating member 174 to pivot about pivot pin 184. As can best be seen by referring to FIGS. 6 and 7, this will cause roller 186 to engage lever arm 190 and move ball 208 rearwardly, as viewed in FIG. 7, to operate fast retraction valve means 191.

Figure 5:
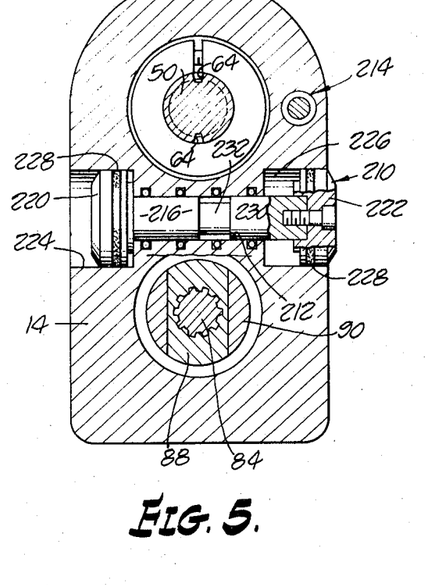
FIG. 5 is a cross-sectional view along line 5—5 of FIG. 2A illustrating the construction of the main control valve of the device.

To control the advance and retraction of the spindle, we provide a main valve 210 which, as can be seen in FIG. 5, is located in a transverse bore or passageway 212 in the housing body. This valve is controlled by fast retraction valve means 191 which, as previously described, is actuated by the feed gear moving backward to operate lever arm 190. Further, the retraction of the spindle is effective to operate a limit valve 214, as will be described later.

Referring particularly to FIG. 5, the main valve can be seen to comprise a generally cylindrical member 216 movable axially in transverse passageway 212 and having, affixed at either end, head portions identified as 220 and 222. Head portions 220 and 222 are axially movable in chambers 224 and 226 which are coaxial with, and interconnected by, passageway 218. Elastomeric O-rings 228 are provided in the head portions and serve to form a gas-tight seal between the head portions and the inner walls of chambers 224 and 226. Elastomeric O-rings 230 are also provided to form a gas-tight seal between member 216 and passageway 218 within which it reciprocates. Intermediate the ends of member 216 is a section 232 of reduced diameter which is adapted to selectively communicate with a gas inlet line, an air exhaust line, and a line leading to brake chamber 128 (gas lines not shown in FIG. 5).

Figure 9:
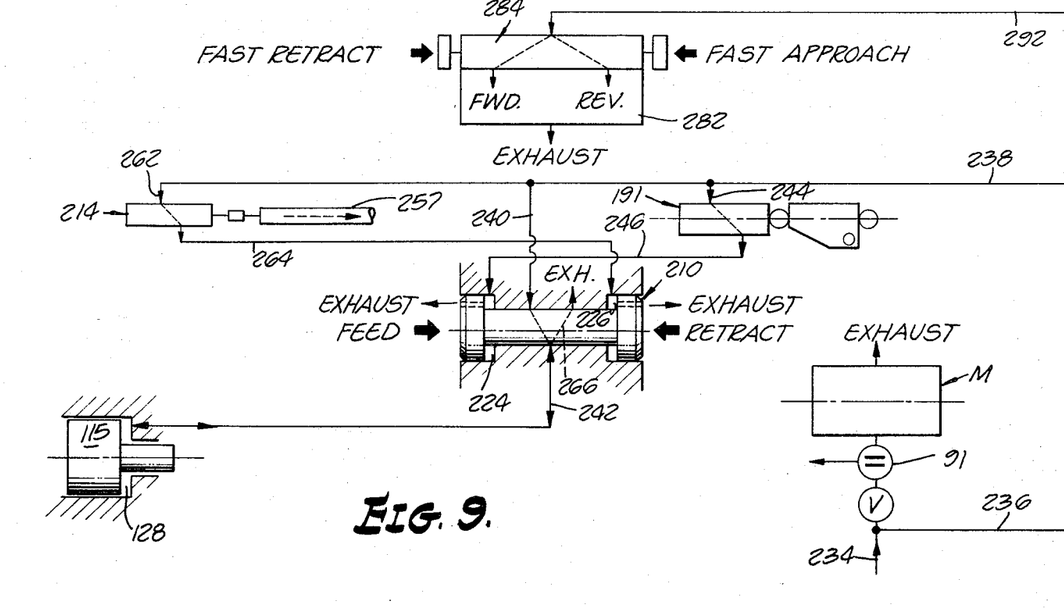
FIG. 9 is a schematic view of the control system.

The operative relationships among the various valves and pneumatically operated mechanisms of the invention can best be understood by referring to FIG. 9 wherein the pneumatic system is diagrammatically represented. Gases under pressure enter the system through inlet 234 and flow to main valve 210 through air lines 236, 238 and 240. When the valve is moved into a retract position (to the left as shown in FIG. 9), gases under pressure may flow through line 242 to the brake. Line 238 also supplies gases under pressure to fast retract valve means 191 through line 244. When the fast retract valve is actuated by movement initiated by the spindle feed member 58 moving rearwardly against fast retract valve actuating member 174, gases will flow through line 246 into chamber 224, causing main valve 210 to move to the left, allowing air to flow to the brake through line 242. As seen in FIG. 2A, this causes the brake to move forward, disengaging coupling member 107 from feed pinion 114 and causing teeth 138 to engage teeth 140 on the feed pinion to stop its rotation. Brake 115, as previously described, is kept from rotation by pins 142 which are press fit into the brake and can slide axially in passageways 144 in the housing. When the feed pinion is stopped, which causes the feed gear to be stopped, the spindle which is still being driven by the drive gear will "thread" itself into the spindle feed member 58 of the feed gear, causing the spindle to rapidly retract.

It is to be noted that if for any reason the brake is not actuated due to a failure in the system, were it not for the novel safety clutch means of the invention, the feed pinion would continue to drive the feed gear, causing it to bind on the spindle and to thus cause damage to the tool. Should such a malfunction occur, the force tending to move member 58 rearwardly will overcome the resistance of spring 80, allowing hub member 58 and gear 60 to separate sufficiently to allow the hub to rotate independently in cooperation with balls 78, thereby preventing damage to the tool. As a further safety precaution, overload sensing device 91 is inserted into line 234. Should an overload occur due to unexpected malfunction of the device, slowing of the motor will cause an increase in back pressure on line 234 sufficient to operate sensing device 91, shutting off the supply of air to the motor.

In order to limit retraction of the spindle, we provide a cylindrical extension in the form of sleeve 250 on the housing and adjustably mount a limit valve actuator means 252 therein to operate limit valve 214 carried by housing 14 and cooperatively associated with the main valve. As can best be seen by referring to FIG. 7, the limit valve actuator means comprises a stroke adjusting member 254 which protrudes radially into sleeve 250 a sufficient distance to intercept that path of a nut 256 affixed near the rearward extremity of spindle 50. Stroke adjusting member 254 is movable longitudinally of sleeve 250 in a longitudinally extending track and is adjustably carried on a valve actuator rod 257 which is operably connected to limit valve 214. When the spindle has retracted a predetermined distance into sleeve 250, nut 256 will engage a roller 258 carried near the inner extremity of stroke adjusting member 254, urging rearward movement of valve actuator rod 257 causing actuation of the limit valve. The distance which the spindle retracts into sleeve 250, i.e., the stroke of the spindle, is adjustable by loosening a set screw 260 on the stroke adjusting member, sliding the member along rod 257 to the desired point, and retightening the set screw.

Referring again to FIG. 9, it can be seen that gases under pressure are provided to limit valve 214 through lines 238 and 262. When the limit valve is actuated by actuator rod 257, gases will be allowed to flow through line 264 into chamber 226, causing main valve 210 to move to the right, allowing gas under pressure within brake chamber 128 to exhaust to atmosphere through passageway 266.

Referring again to FIG. 2A, when the gases under pressure in brake chamber 128 are exhausted, springs 112 and 136 will urge the brake rearwardly. As the brake moves rearwardly, latch element 146 will engage notch 148 so as to hold the brake in a position such that it is disengaged from feed pinion 114, while at the same time continuing to hold coupling 107 in disengagement from the feed pinion. In this position feed gear 56 is allowed to freewheel. The tool will remain in this "idling" status until member 150 is depressed by the operator, allowing the brake to fully retract and allowing coupling 107 to move into engagement with feed pinion 114 which will again cause the spindle to advance.

Because the spindle advances at a very slow rate in normal operation of the tool, I provide a novel means for rapidly advancing it so as to place the drill bit adjacent the work in an expeditious and efficient manner. This feature facilitates tool setup and allows "pecking" when drilling and countersinking deep holes. Referring particularly to FIGS. 1, 3 and 4, the rapid spindle advance means, which is an important feature of the invention, can be seen to comprise a compact and efficient, but low-powered pneumatic motor assembly 280 affixed to housing 14. As seen in FIG. 4, the assembly comprises a second motor 282 which is preferably pneumatically driven and reversible, although reversibility is not required, a control valve means 284, a pinion 286 affixed to motor shaft 288, and an idler gear 290. The motor assembly is affixed to housing 14 at a location which permits the idler gear to drivably engage feed pinion 114.

Referring to FIG. 9, gases under pressure are provided to the air motor through line 292. In operation, with the tool in idling position, valve means 284 is actuated, allowing gases to flow to the motor causing pinion 286 to rotate gear 290 which in turn drives feed pinion 114 at an accelerated rate. This will cause the spindle to advance at an accelerated rate, bringing the drill bit expeditiously into juxtaposition with the work. Motor 282 may of course be stopped by manually closing valve means 284. For routine operations, however, the operator may allow the tool bit to move into engagement with the work and, because the driving torque of the motor is small compared to the resistance to rotation offered by the work, the motor will automatically stop when the tool engages the work without causing damage to the work or to the tool. If a reversible motor is used as is illustrated, the spindle may be rapidly retracted by by simply moving valving means 284 into a position to cause reverse rotation of motor 282.

Figure 10:
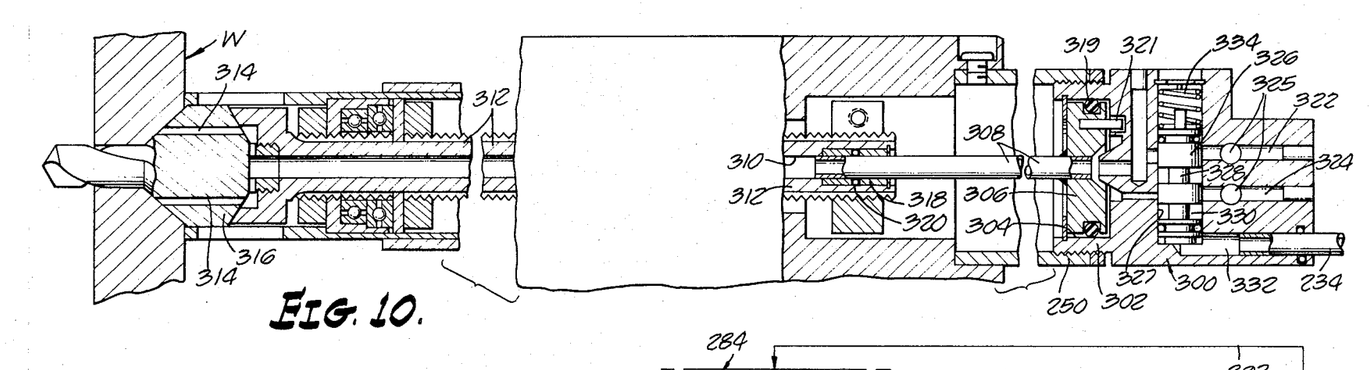
FIG. 10 shows another embodiment of our invention illustrating means for cooling the drill bit.

Referring to FIG. 10, there is illustrated another form of the invention in which means are provided for cooling the drill bit in a novel and efficient manner during the drilling operation. In describing this embodiment, like numerals will be used to identify like parts in the previously described embodiment.

Means for introducing a cooling fluid into the tool for cooling the work engaging drill can be seen to comprise a coolant assembly body member 300 having a forwardly protruding (to the left as viewed in FIG. 10) cylindrical flange portion 302 which is threadably received within sleeve 250 at its rearward extremity. Carried within flange portion 302 and held captive therein by a retainer ring 304 is a locating ring member 306 which serves to support an elongated hollow tube member 308 which protrudes forwardly therefrom. Tube member 308 is adapted to be telescopically received within a central bore 310 which extends the entire length of spindle 312 and communicates with cooling fluid passageways 314 provided in drill bit 316. Carried within bore 310 near its rearward extremity is a bearing 318 which is provided with an elastomeric O-ring 320 adapted to sealably engage tube member 308. As spindle 312 rotates during the drilling operation, tube member 308, which conveys cooling gas from housing 300 into bore 310, is rotatably supported near its forward end by bearing 318. Since tube member 308 has an outside diameter slightly less than the inside diameter of bearing 318, the tube may telescope freely in and out of the central bore in the spindle as the spindle advances and retracts during the drilling operation. In order to compensate for any axial misalignment which may exist among the various cooperating parts of the drill and the cooling means, clearance is provided between locating ring member 306 and flange portion 302 and, additionally, housing 300 is allowed to freely swivel within sleeve 250.

To prevent the leakage of coolant through the clearance space between the parts, ring member 306 is provided with an elastomeric O-ring 310, which sealably engages flange portion 302. So that body portion 300 and ring member 306 will swivel as a unit when, due to misalignment between the spindle and the tube, rotational forces are imparted to the body as the spindle rotates, a dowel pin 321 is provided to rotationally couple the parts.

Communicating with tube member 308 is a pair of longitudinally extending fluid carrying passageways 322 and 324 formed within body 300. Passageways 322 and 324 are adapted to be interconnected with a remotely located source of cooling fluid which is not shown. Although many types of cooling fluids may be used, we have found the use of a mixture of air and freon to be quite satisfactory. Where such cooling fluids are used, a source of freon under pressure would be suitably connected to one input passageway and a source of air under pressure would be connected to the other input passageway. Metering devices, indicated by the numeral 325 of any suitable type, which devices are well known in the art, may be used to regulate the flow of the gases to obtain the desired mixture of the gases.

Interposed between tube member 308 and passageways 322 and 324 is a control means shown in the form of a generally cylindrical spool member 326 which is mounted for axial movement within a bore 327 which extends transversely of body 300. Intermediate the ends of spool member 326 are reduced diameter portions 328 and 330 which are located so that they may be moved into communication with passageways 322 and 324 as the spool moves axially within bore 327.

At one extremity of bore 327 is an interconnecting passageway 332 which communicates with air line 234 which supplies air to the main air motor M. Passageway 332 is interconnected with air line 234 in a manner such that when the motor is running air under pressure will be supplied to bore 327. The supply of air under pressure to bore 327 causes spool member 326 to move from its normally closed position, in which it is held due to the urging of biasing means 334, into a position which brings reduced diameter portions 328 and 330 into register with passageways 322 and 324, allowing the gases to flow into tube member 308. As the gases flow into tube member 308, they are mixed and then pass forwardly of the device through bore 310 in spindle 312 to the tool bit where they provide the desired cooling. It is important to note that, due to the novel construction of the means for cooling the drill bit, coolant is dispersed to the cutting tool only when the motor is running. When the motor is started, air under pressure is supplied to bore 327 actuating the valve in the manner described. This unique feature of the invention saves coolant and eliminates the need for a separate on-off valve for the means for cooling the drill bit.

We claim:

1. A positive feed device comprising:
   a. a rotatable spindle;
   b. means for advancing said spindle relative to a work piece;
   c. means for sensing the location of the surface of the work piece; and
   d. means located between and cooperatively associated with said means for advancing said spindle and said means for sensing the location of the surface of the work piece for limiting the advance of the spindle at a predetermined point relative to the surface of the work.

2. A positive feed device as defined in claim 1 in which said means for sensing the surface of the work piece comprises a member movable relative to said spindle, said member having a work piece surface sensing face and a stop means for stopping the advance of said spindle at a predetermined point relative to said work piece surface sensing face.

3. A positive feed device as defined in claim 2 in which said spindle is provided with an axially adjustable spindle stop means adapted to operatively engage said stop means of said surface sensing member.

4. A positive feed device as defined in claim 1 in which said means for sensing the location of the surface of the work piece comprises a sleeve through which the spindle may be received, said sleeve being adapted to be axially movable relative to said spindle.

5. A positive feed device as defined in claim 4 in which said sleeve is provided with a sensing sleeve stop adapted to cooperate with said means for limiting the advance of said spindle.

6. A positive feed drill as defined in claim 5 in which said means for limiting the advance of said spindle comprises a spindle stop adjustably mounted on said spindle which spindle stop is adapted to operatively engage the sensing sleeve stop of said sleeve.

7. A positive feed drill as defined in claim 6 in which said spindle stop comprises first and second cooperatively associated members slidably interconnected with said spindle and means for adjustably positioning said members axially on said spindle.

8. A positive feed device comprising:
 a. a housing;
 b. a rotatable spindle receivable through said housing;
 c. means housed within said housing for advancing and retracting said spindle relative to a work piece;
 d. means mounted on said housing for telescopic movement relative thereto for engaging the surface of the work piece, said means comprising a sleeve through which the spindle is receivable, said sleeve being movable telescopically relative to said housing;
 e. means located between and cooperatively associated with said means for advancing and retracting said spindle and said means for engaging the surface of the work piece for limiting the advance of the spindle at a predetermined point relative to the surface of the work; and
 f. means for automatically retracting said spindle after a predetermined point relative to the surface of the work has been reached.

9. A positive feed drilling device as defined in claim 8 including biasing means urging against telescopic movement of said sleeve relative to said housing.

10. A positive feed drilling device as defined in claim 8 in which said sleeve is provided with an internal abutment adapted to cooperate with said means for limiting the advance of said spindle.

11. A positive feed device as defined in claim 8 in which said means housed within said housing for advancing and retracting said spindle relative to a work piece comprises a first motor operatively coupled with said spindle and adapted to advance said spindle at a first rate of speed.

12. A positive feed device as defined in claim 11 including a second motor affixed to said housing, operatively coupled with said spindle and adapted to expeditiously advance said spindle at a second rate of speed to a point adjacent the work piece.

13. A positive feed device as defined in claim 8 in which said means for automatically retracting said spindle comprises:
 a. an internally threaded rotatable feed member threadably receiving said spindle and adapted for limited axial movement relative to said spindle;
 b. driving means operatively coupled with said feed member for driving said feed member; and
 c. means for decoupling said feed member and said driving means upon a predetermined amount of axial movement of said feed member relative to said spindle.

14. A positive feed device as defined in claim 13 in which said means for decoupling said feed member comprises a ring member having a plurality of balls rotatably mounted therein, said balls being adapted to operably engage said feed member and said driving means.

15. A positive feed device as defined in claim 13 including control means for controlling the operation of said driving means and a mechanical linkage operable by axial movement of said feed member to operate said control means.

* * * * *